(12) United States Patent
Yoshikawa (10) Patent No.: US 10,110,778 B2
(45) Date of Patent: Oct. 23, 2018

(54) IMAGE PROCESSING METHOD, IMAGE PROCESSING APPARATUS, IMAGE PROCESSING PROGRAM, AND PRINTING SYSTEM

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/435,870

(22) Filed: Feb. 17, 2017

(65) Prior Publication Data

US 2017/0244860 A1   Aug. 24, 2017

(30) Foreign Application Priority Data

Feb. 23, 2016   (JP) ................................. 2016-031687

(51) Int. Cl.
  *H04N 1/405*   (2006.01)
  *G06K 15/02*   (2006.01)
  *G06K 15/10*   (2006.01)

(52) U.S. Cl.
  CPC ......... *H04N 1/4052* (2013.01); *G06K 15/102* (2013.01); *G06K 15/1836* (2013.01)

(58) Field of Classification Search
  CPC .. H04N 1/4052; G06K 15/102; G06K 15/1836
  USPC ...................... 358/3.06, 3.05, 3.13, 1.9, 1.15
  See application file for complete search history.

(56) References Cited

U.S. PATENT DOCUMENTS

| 2009/0059303 A1* | 3/2009 | Miyazaki | H04N 1/4053 |
| | | | 358/3.03 |
| 2016/0034797 A1* | 2/2016 | Yoshida | H04N 1/4052 |
| | | | 358/1.9 |

FOREIGN PATENT DOCUMENTS

| JP | 2009-060538 A | 3/2009 |
| JP | 2011-095807 A | 5/2011 |

* cited by examiner

*Primary Examiner* — Quang N Vo (57) ABSTRACT

An image processing method in which image data including a grayscale value in each pixel is converted into print data including formation necessity of dots, includes extracting a region in which a total value of the grayscale value of the pixel included in each predetermined division in which the image data is divided does not become a predetermined threshold value as a non-processing region; and extracting a region surrounded with the non-processing region as a processing region.

11 Claims, 7 Drawing Sheets

| | A | B | C | D | E | F | G | H | I |
|---|---|---|---|---|---|---|---|---|---|
| 1 | 0 | 0 | 0 | 0 | 0 | 0 | 0 | 0 | 0 |
| 2 | 0 | 2 | 5 | 5 | 8 | 10 | 5 | 0 | 0 |
| 3 | 0 | 2 | 10 | 60 | 255 | 255 | 10 | 0 | 0 |
| 4 | 0 | 5 | 30 | 255 | 255 | 255 | 5 | 0 | 0 |
| 5 | 0 | 2 | 4 | 8 | 8 | 4 | 2 | 0 | 0 |
| 6 | 0 | 0 | 2 | 5 | 5 | 2 | 0 | 0 | 0 |
| 7 | 0 | 0 | 100 | 200 | 200 | 200 | 2 | 0 | 0 |
| 8 | 0 | 5 | 255 | 255 | 200 | 200 | 2 | 0 | 0 |
| 9 | 0 | 0 | 2 | 2 | 2 | 2 | 0 | 0 | 0 |

FIG. 7

IMAGE PROCESSING METHOD, IMAGE PROCESSING APPARATUS, IMAGE PROCESSING PROGRAM, AND PRINTING SYSTEM

BACKGROUND

1. Technical Field

The present invention relates to an image processing method, an image processing apparatus, and an image processing program related to processing of converting image data into print data, and a printing system.

2. Related Art

In an image processing apparatus which outputs general image data of RGB obtained by a digital camera, or the like, by converting the image data into print data for performing printing in an ink jet printer, as a method of converting multi-grayscale image data into binarized print data, an error diffusion method, for example, is used. The error diffusion method is a method in which a quantization error when binarizing a target pixel is diffused to a grayscale value of a pixel in the vicinity of the target pixel which is not subjected to binarization, and each grayscale value thereof is successively binarized.

Since data conversion processing using the error diffusion method is performed while diffusing a quantization error one after another, it is possible to form a dependency relationship in data processing with respect to data in a diffusion destination, and it is necessary to continuously perform conversion processing in series, in a range in which the dependency relationship is present. As a result, for example, in a case in which an image becomes large, and becomes an image with high resolution, the number of pixels to be continuously processed in series increases, and accordingly, a processing time becomes long.

In a case of processing large image data which exceeds a size of a memory space for performing data processing, in many cases, the processing proceeds while dividing the image data into an allowable size. With respect to the above described problem, in JP-A-2011-95807, an image processing apparatus and an image processing method are described, in which it is possible to process divided image data in parallel in a dependency direction of data processing, by setting a division direction thereof to a direction orthogonal to a direction in which a dependency relationship in data processing is present, when dividing the image data, and as a result, it is possible to improve throughput of data processing.

However, in the image processing apparatus and the image processing method which are described in JP-A-2011-95807, there is a problem in that a dependency relationship in data processing, that is, a direction for performing an error diffusion is limited in order to make a division of image data possible, and depending on a direction in which a division is possible. In addition, there is a problem in that, in a case in which a direction of proceeding printing sequentially is orthogonal to a direction in which image data is divided, it is not possible to start printing until conversion processing of the entire image data is completed, in a case of a printing apparatus which performs printing while sequentially receiving converted print data.

SUMMARY

The invention can be realized in the following application examples or aspects.

Application Example 1

According to this application example, there is provided an image processing method in which image data including a grayscale value in each pixel is converted into print data including formation necessity of dots, the method including extracting a region in which a total value of the grayscale value of the pixel included in each predetermined division in which the image data is divided does not become a predetermined threshold value as a non-processing region; and extracting a region surrounded with the non-processing region as a processing region.

According to the image processing method in the application example, it is possible to divide a region of image data using an index of a grayscale value (that is, density of dots) of a pixel by extracting a region in which a total value of a grayscale value of a pixel included in each predetermined division does not become a predetermined threshold value as a non-processing region, and extracting a region of which the periphery is surrounded with the non-processing region as a processing region. By dividing a region of image data in this manner, it is possible to select a data conversion method which is appropriate for respective regions.

Application Example 2

In the image processing method according to the application example, data for determining formation necessity of dots which is included in the non-processing region, and corresponds to a pixel included in the division which is not in contact with the processing region may be set so as not to form dots.

According to the image processing method in the application example, in processing of converting image data into print data, it is possible to perform batch processing in which data for determining formation necessity of dots corresponding to a pixel which is included in the non-processing region, and is included in a division which is not in contact with the processing region is set so as not to form dots. That is, since it is not necessary to perform conversion processing of data related to each pixel in the same way, in the entire image data, it is possible to improve throughput in data conversion processing.

In addition, a pixel included in a division which is in contact with a processing region becomes a data conversion target, and since error diffusion from the pixel included in the processing region is reflected in a case of performing halftoning processing using the error diffusion method, for example, it is possible to suppress a deterioration in image quality at a boundary between the processing region and the non-processing region.

Application Example 3

In the image processing method according to the application example, halftoning processing may be simultaneously performed with respect to the respective processing regions, in a case in which there are a plurality of the processing regions which are extracted.

According to the image processing method in the application example, in a case in which there are a plurality of the processing regions which are extracted, it is possible to improve throughput in data conversion processing by simultaneously performing the halftoning processing with respect to the respective processing regions. For example, it is possible to simultaneously use a plurality of digital signal processors (DSP) as a data conversion processing engine, and improve throughput in data conversion processing.

Application Example 4

In the image processing method according to the application example, in the halftoning processing, error diffusion processing based on the error diffusion method may be performed, the error diffusion processing may be performed from a pixel which is included in the processing region, and is in contact with the non-processing region to a pixel which is included in the non-processing region, and is included in the division which is in contact with the processing region, and the error diffusion processing may not be performed with respect to a pixel included in the non-processing region, and is included in the division which is not in contact with the processing region.

According to the image processing method in the application example, in the halftoning processing, the error diffusion processing based on the error diffusion method is performed, and the error diffusion processing is performed from a pixel which is included in the processing region, and is in contact with the non-processing region to a pixel which is included in the non-processing region, and is included in a division which is in contact with the processing region. For this reason, since error diffusion of a pixel included in the processing region is appropriately performed, by appropriately setting a predetermined division, it is possible to perform data conversion without deteriorating a printing quality.

In addition, since the error diffusion processing is not performed with respect to a pixel included in the non-processing region, and is included in a division which is not in contact with the processing region, it is possible to make a time necessary for the error diffusion processing short, and improve throughput in data conversion processing.

Application Example 5

According to the application example, there is provided an image processing apparatus which converts image data including a grayscale value in each pixel into print data including formation necessity of dots, the apparatus including an input unit which inputs the image data; and an operation unit which converts the input image data into the print data, in which the operation unit performs non-processing region extracting processing of extracting a region in which a total value of the grayscale value of the pixel included in each predetermined division in which the image data is divided does not become a predetermined threshold value as a non-processing region, and processing region extracting processing of extracting a region surrounded with the non-processing region as a processing region.

According to the image processing apparatus in the application example, it is possible to divide a region of image data using an index of a grayscale value (that is, density of dots) of a pixel, by extracting a region in which a total value of a grayscale value of a pixel included in each predetermined division does not become a predetermined threshold value as a non-processing region, and extracting a region of which the periphery is surrounded with the non-processing region as a processing region. By dividing the region of image data in this manner, it is possible to select a data conversion method which is appropriate for respective regions.

Application Example 6

In the image processing apparatus according to the application example, the operation unit may set data for determining formation necessity of dots corresponding to a pixel which is included in the non-processing region, and is included in the division which is not in contact with the processing region so as not to form dots.

According to the image processing apparatus in the application example, in processing of converting image data into print data, it is possible to perform batch processing in which data for determining formation necessity of dots corresponding to a pixel which is included in the non-processing region, and is included in a division which is not in contact with the processing region is set so as not to form dots. That is, since it is not necessary to perform conversion processing of data related to each pixel in the same way, in the entire image data, it is possible to improve throughput in data conversion processing.

In addition, a pixel included in a division which is in contact with a processing region becomes a data conversion target, and since error diffusion from the pixel included in the processing region is reflected in a case of performing halftoning processing using the error diffusion method, for example, it is possible to suppress a deterioration in image quality at a boundary between the processing region and the non-processing region.

Application Example 7

In the image processing apparatus according to the application example, the operation unit may simultaneously perform halftoning processing with respect to the respective processing regions, in a case in which there are a plurality of the processing regions which are extracted.

According to the image processing apparatus according to the application example, it is possible to improve throughput in data conversion processing, by simultaneously performing the halftoning processing with respect to respective processing regions, in a case in which there are a plurality of extracted processing regions. For example, it is possible to improve throughput in data conversion processing by simultaneously using a plurality of DSPs, as a data conversion processing engine.

Application Example 8

According to the application example, there is provided an image processing program which is executed in an image processing apparatus which converts image data including a grayscale value in each pixel to print data including formation necessity of dots, the program including extracting a region in which a total value of the grayscale value of the pixel included in each predetermined division in which the image data is divided does not become a predetermined threshold value as a non-processing region, and extracting a region surrounded with the non-processing region as a processing region.

According to the image processing program in the application example, it is possible to divide a region of image data using an index of a grayscale value (that is, density of dots) of a pixel by extracting a region in which a total value of a grayscale value of a pixel included in each predetermined division does not become a predetermined threshold value as a non-processing region, and extracting a region of which the periphery is surrounded with the non-processing region as a processing region. By dividing a region of image data in this manner, it is possible to select a data conversion method which is appropriate for respective regions.

Application Example 9

According to the application example, there is provided a printing system including a printing apparatus which performs printing based on the image processing apparatus according to the above described application example, and print data which is generated by the image processing apparatus.

According to the printing system in the application example, it is possible to perform printing with high efficiency since the image processing apparatus according to the above described application example is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment in which the invention is embodied will be described with reference to drawings. The following embodiment is one embodiment of the invention, and does not limit the invention. In each figure below, there is a case in which scales different from actual scales are described, in order to make descriptions easy to understand. In addition, in coordinates added to drawings, a Z axis direction is set to a vertical direction, a +Z direction is set to an upper direction, a Y axis direction is set to an anteroposterior direction, a +Y direction is set to a forward direction, an X axis direction is set to a horizontal direction, a +X direction is set to a left direction, and an X-Y plane is set to a horizontal plane.

First Embodiment

Printing System

Figure 1:
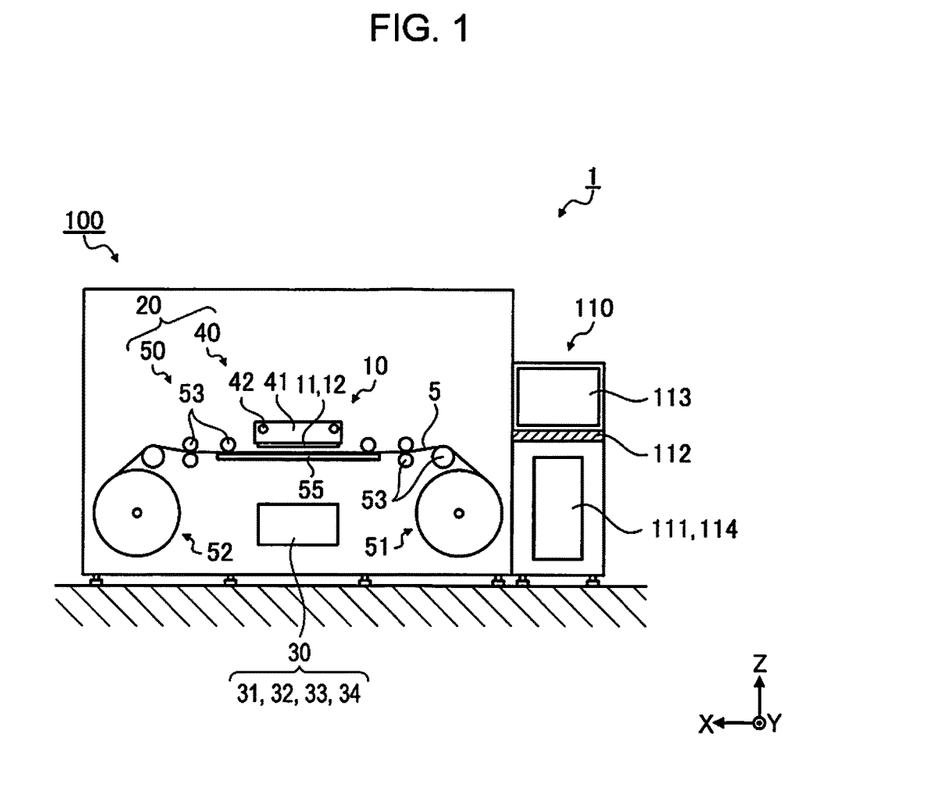
FIG. 1 is a front view which illustrates a configuration of a printing system according to a first embodiment.
Figure 2:
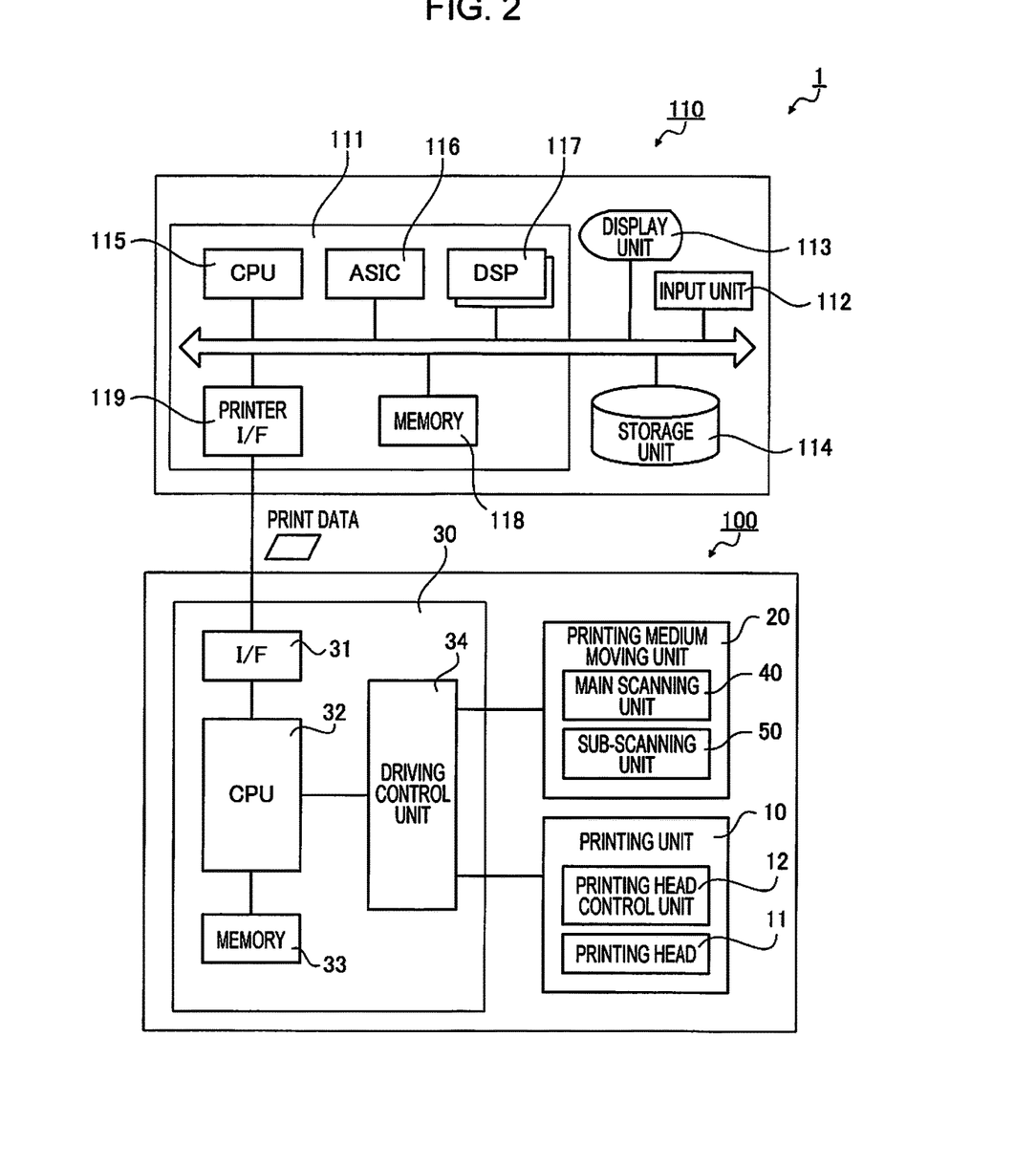
FIG. 2 is a block diagram which illustrates a configuration of the printing system according to the first embodiment.

FIG. 1 is a front view which illustrates a configuration of a printing system 1 according to the first embodiment, and FIG. 2 is a block diagram of the printing system 1.

The printing system 1 is configured of a printing apparatus 100, and a personal computer 110 (hereinafter, referred to as PC 110) as an "image processing apparatus" which is connected to the printing apparatus 100. The printing apparatus 100 is an ink jet printer which prints a desired image on a long printing medium 5 which is supplied in a state of being wound in a roll shape, based on print data which is received from the PC 110.

Image Processing Apparatus (PC 110)

The PC 110 is provided with a printer control unit 111 as an "operation unit", an input unit 112, a display unit 113, a storage unit 114, and the like, and performs a printing job control in which the printing apparatus 100 is caused to perform printing.

General image processing application software (hereinafter, referred to as application) which treats image data to be printed, or printer driver software (hereinafter, referred to as printer driver) which controls the printing apparatus 100, or generates print data for causing the printing apparatus 100 to execute printing is included in software which the PC 110 operates.

The printer control unit 111 is provided with a central processing unit (CPU) 115, an application specific integrated circuit (ASIC) 116, a plurality of digital signal processors (DSP) 117, a memory 118, a printer interface 119, and the like, and performs a centralized management of the entire printing system 1.

The input unit 112 is an information input unit for the PC 110, and specifically, is a port, or the like, to which a keyboard as a human interface, or an information input device, for example, is connected.

The display unit 113 is an information display unit (display) as a human interface, and on which information input from the input unit 112, an image to be printed in the printing apparatus 100, information on a printing job, and the like, are displayed based on a control of a printer control unit 111.

The storage unit 114 is a rewriteable storage medium such as a hard disk drive (HDD), a memory card, or the like, in which the software (program operated in printer control unit 111) which the PC 110 operates, an image to be printed, information on a printing job, and the like, are stored.

The memory 118 is a storage medium which secures an area for storing a program which the CPU 115 operates, a work area for operating, and the like, and is configured of a storage element such as a RAM, an EEPROM, or the like.

The printer interface 119 is an interface which connects the PC 110 and the printing apparatus 100, and transmits and receives information, and has a function of sending print data for causing the printing apparatus 100 to perform printing.

Basic Configuration of Printing Apparatus 100

The printing apparatus 100 is configured of a printing unit 10, a printing medium moving unit 20, a control unit 30, and the like. The printing apparatus 100 which receives print data from the PC 110 controls the printing unit 10, and the printing medium moving unit 20 using the control unit 30, and prints an image (image forming) on the printing medium 5.

The print data is, for example, data for forming an image which is obtained by converting general image data (for example, digital image information of RGB) which is obtained by a digital camera, or the like, so as to be printed in the printing apparatus 100 using the application and the printer driver included in the PC 110, and includes a command for controlling the printing apparatus 100.

The printing unit 10 is configured of a printing head 11, a printing head control unit 12, and the like.

The printing medium moving unit 20 is configured of a main scanning unit 40, a sub-scanning unit 50, and the like. The main scanning unit 40 is configured of a carriage 41, a guide shaft 42, a carriage motor (not illustrated), and the like. The sub-scanning unit 50 is configured of a supply unit 51, an accommodating unit 52, a transport roller 53, a platen 55, and the like.

The printing head 11 includes a plurality of nozzles (nozzle column) which eject printing ink (hereinafter, referred to as ink) as liquid droplets (hereinafter, also referred to as ink droplets). The printing head 11 is mounted on the carriage 41, and reciprocates in a scanning direction along with the carriage 41 which moves in the scanning direction (Y axis direction illustrated in FIG. 1). Dot columns (raster line) which go along the scanning direction are formed on the printing medium 5 when the printing head 11 ejects ink droplets onto the printing medium 5 which is supported by the platen 55 while moving in the scanning direction, under a control of the control unit 30.

As ink, for example, as an ink set formed of a dark ink composition, there is an ink set of four colors, or the like, in which a black color (K) is added to an ink set of three colors of cyan (C), magenta (M), and yellow (Y). In addition, there is an ink set of eight colors, or the like, to which an ink set of light cyan (Lc), light magenta (Lm), light yellow (Ly), light black (Lk), and the like, which are formed of a light ink composition obtained by making density of respective coloring materials light is added, for example.

As an ink droplet ejecting method (ink jet method), a piezoelectric method is preferably used. The piezoelectric method is a method in which a pressure corresponding to a printing information signal is applied to ink stored in a pressure chamber using a piezoelectric element, and printing is performed by discharging (ejecting) ink droplets from a nozzle which communicates with the pressure chamber.

A method of ejecting ink droplets is not limited to this, and may be another recording method in which ink is discharged in a liquid droplet shape, and a dot group is formed on the printing medium. For example, it may be a method of forcibly discharging ink droplets by applying a pressure to ink using a small pump, and mechanically vibrating a nozzle using a crystal resonator, or the like, a method of performing recording by discharging ink droplets, by causing ink to be heated and foamed, using a microelectrode according to a recording information signal (thermal jet method), or the like.

The printing medium moving unit 20 (main scanning unit 40 and sub-scanning unit 50) causes the printing medium 5 to relatively move with respect to the printing unit 10 under a control of the control unit 30.

The guide shaft 42 extends in the scanning direction, and supports the carriage 41 in a state of being in sliding contact therewith, and the carriage motor becomes a driving source when causing the carriage 41 to reciprocate along the guide shaft 42. That is, the main scanning unit 40 (carriage 41, guide shaft 42, and carriage motor) moves the carriage 41 (that is, printing head 11) in the scanning direction along the guide shaft 42 under a control of the control unit 30.

The supply unit 51 rotatably supports a reel on which the printing medium 5 is wound in a roll shape, and sends the printing medium 5 to a transport path. The accommodating unit 52 rotatably supports a reel which winds up the printing medium 5, and winds up the printing medium 5 on which printing is completed from the transport path.

The transport roller 53 is formed of a driving roller which moves the printing medium 5 in the sub-scanning direction (X axis direction illustrated in FIG. 1) which intersects the scanning direction, a driven roller which rotates along with a movement of the printing medium 5, or the like, and configures the transport path through which the printing medium 5 is transported to the accommodating unit 52 from the supply unit 51 via a printing region of the printing unit 10 (region in which printing head 11 moves in scanning manner on top face of platen 55).

The control unit 30 is provided with an interface unit 31, a CPU 32, a memory 33, a driving control unit 34, and the like, and performs a control of the printing apparatus 100.

The interface unit 31 is connected to the printer interface 119, and performs transceiving of data between the PC 110 and the printing apparatus 100.

The CPU 32 is an operation processing unit for performing a control of the entire printing apparatus 100.

The memory 33 is a storage medium for securing an area for storing a program which the CPU 32 operates, and a work area for operating, and is configured of a storage element such as a RAM, an EEPROM, and the like.

The CPU 32 controls the printing medium moving unit 20 (main scanning unit 40 and sub-scanning unit 50), and the printing unit 10 (printing head 11) through the driving control unit 34 according to a program which is stored in the memory 33, and print data received from the PC 110.

Basic Function of Printer Driver

Figure 3:
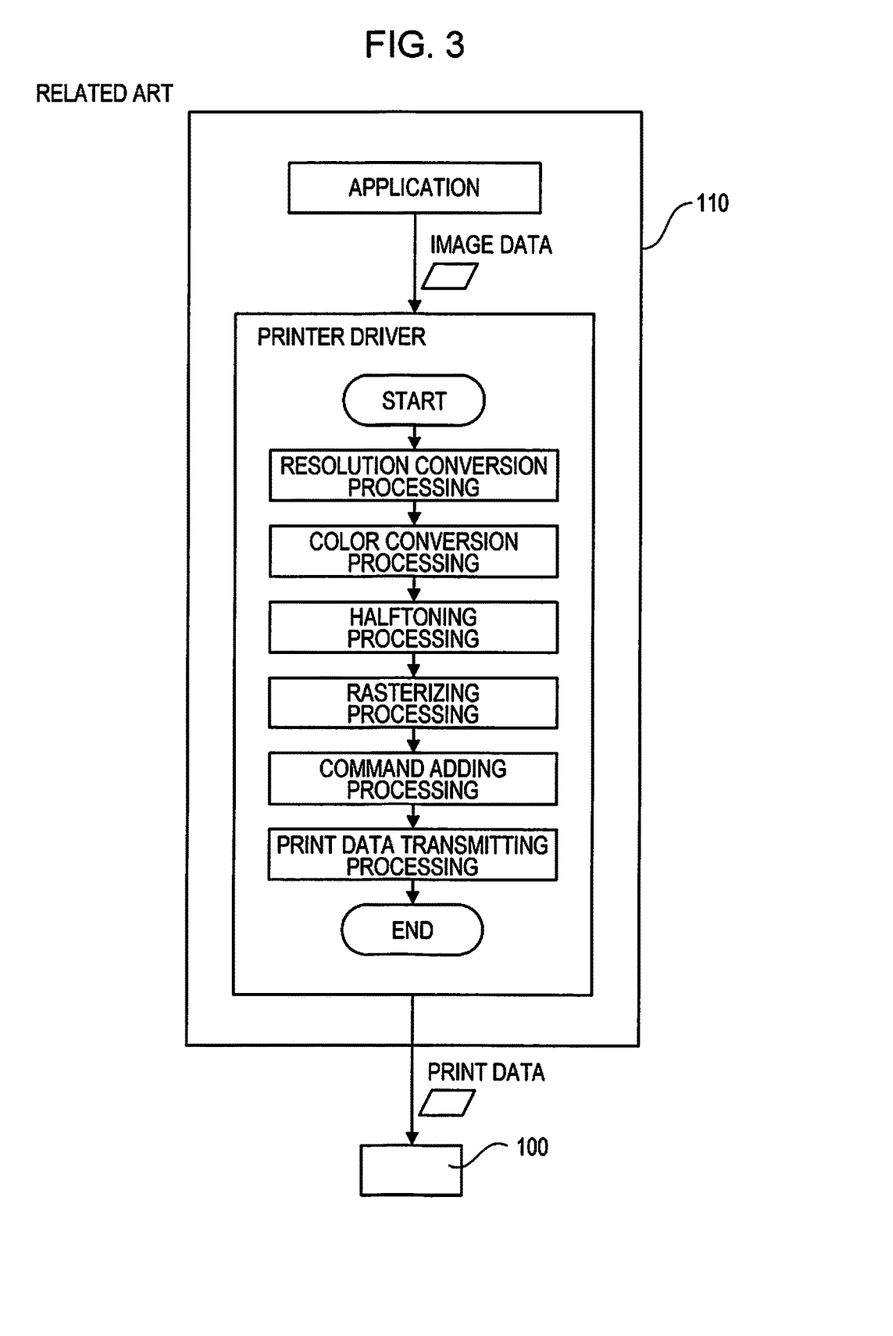
FIG. 3 is an explanatory diagram of a basic function of a printer driver in the related art.

FIG. 3 is an explanatory diagram of a basic function of the printer driver in the related art.

Printing on the printing medium 5 is started when print data is sent from the PC 110 connected to the printing apparatus 100. Print data is generated by the printer driver.

Hereinafter, basic contents in a process of generating print data will be described with reference to FIG. 3.

The printer driver receives image data (for example, text data, or image data of full color) from an application, converts the image data into print data with a format which can be interpreted by the printing apparatus 100, and outputs the print data to the printing apparatus 100. When converting image data from an application into print data, the printer driver performs resolution conversion processing, color conversion processing, half toning processing, rasterizing processing, command adding processing, or the like.

Hereinafter, a case in which image data before generating print data is data including 256 grayscales (grayscale value (0 to 255)) will be described as an example. In addition, for easy understanding, the grayscale value is used in the sense that, when the value increases, density becomes dark.

The resolution conversion processing is processing in which image data output from an application is converted into data with a resolution (printing resolution) when being printed on the printing medium 5. For example, in a case in which a printing resolution is designated to 720 dpi×720 dpi, image data of a vector format which is received from the application is converted into image data of a bitmap format with a resolution of 720 dpi×720 dpi. Each pixel data of image data after being subjected to resolution conversion processing is configured of pixels which are arranged in matrix in a two-dimensional data space. Each pixel includes a grayscale value of 256 grayscales of an RGB color space. That is, pixel data after the resolution conversion denotes a grayscale value of a corresponding pixel.

Pixel data corresponding to pixels of one column which align in a predetermined direction in the pixels arranged in matrix is referred to as raster data. In addition, the predetermined direction in which pixels corresponding to the raster data align corresponds to a movement direction (scanning direction) of the printing head 11 when printing an image.

The color conversion processing is processing in which RGB data is converted into data of a CMYK color space. The CMYK color is cyan (C), magenta (M), yellow (Y), and black (K), and image data of the CMYK color space is data corresponding to a color of ink included in the printing apparatus 100. Accordingly, for example, in a case in which the printing apparatus 100 uses ink of ten types of the CMYK color, the printer driver generates image data of a ten-dimensional space of the CMYK color, based on the RGB data.

The color conversion processing is performed based on a table (color conversion look up table LUT) in which a grayscale value of the RGB data and a grayscale value of the CYMK color data are associated with each other. Pixel data after the color conversion processing is the CMYK color data of 256 grayscales which is expressed, using the CMYK color space.

The halftoning processing is quantization processing in which data of high grayscale (256 grayscales) is converted into data of grayscales which can be formed by the printing apparatus 100 in each ink color provided in the printing apparatus 100. By performing the halftoning processing, data denoting 256 grayscales is converted into 1 bit data which denotes two grayscales (with or without dot), or 2 bit data which denotes four grayscales (no dot, small dot, medium dot, and large dot). Specifically, a dot generating ratio (for example, each generating ratio of no dot, small dot, medium dot, and large dot in case of four grayscales) corresponding to a grayscale value is obtained from a dot generating ratio table in which the grayscale value (0 to 255) and the dot generating ratio correspond to each other, and pixel data is created so that dots are formed by being distributed, using a dither method, the error diffusion method, or the like, in the obtained generating ratio.

That is, pixel data after the halftoning processing is 1 bit data or 2 bit data, and becomes data which denotes formation necessity of dots (presence or absence of dots, or size of dots) in each pixel. For example, a conversion of four stages is performed such as a grayscale value of a dot [00] corresponding to no dot, a grayscale value of a dot [01] corresponding to formation of a small dot, a grayscale value of a dot [10] corresponding to formation of a medium dot, and a grayscale value of a dot [11] corresponding to formation of a large dot, in a case of 2 bits (four grayscales).

The rasterizing processing is processing in which pixel data items aligned in matrix are rearranged according to a dot forming order at a time of performing printing.

The command adding processing is processing of adding command data corresponding to a printing method to data which is rasterized. As the command data, for example, there is transport data related to a transport specification (movement amount, speed, or the like, in sub-scanning direction) of the medium.

Processing of these using the printer driver is performed by an ASIC 116 and a DSP 117 (refer to FIG. 2) based on a control of a CPU 115, and generated print data is transmitted to the printing apparatus 100 through the printer interface 119.

Image Processing Method Characterizing the Embodiment

In the basic function which is described above, an image processing method which characterizes the embodiment will be subsequently described. An effect of the image processing method in the embodiment is exhibited in data processing in which a dependency relationship can be formed between data items, as in data conversion using the error diffusion method.

Figure 4:
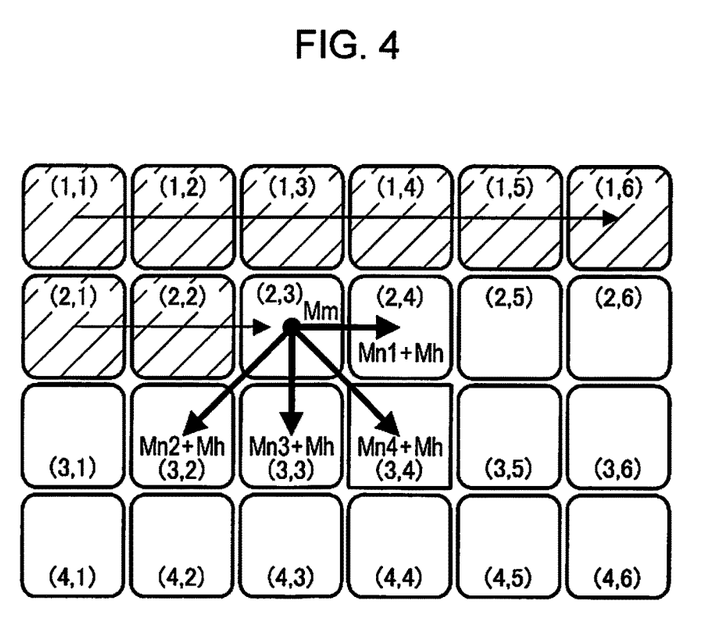
FIG. 4 is a conceptual diagram which describes an example of halftoning processing using an error diffusion method.

FIG. 4 is a conceptual diagram which describes an example of halftoning processing using the error diffusion method. FIG. 4 illustrates pixels which align in matrix formed of raster lines of four rows (raster data (1, 1) to (1, 6), (2, 1) to (2, 6), (3, 1) to (3, 6), and (4, 1) to (4, 6)).

The error diffusion method is a method of successively binarizing each grayscale value while diffusing a quantization error which occurs when converting (quantizing) a grayscale value of a target pixel into binarized data of 1 bit or 2 bits into a grayscale value of a pixel in the vicinity of the target pixel which is not subjected to binarization, as a correction grayscale value.

In the error diffusion method, a direction of proceeding quantization is determined in advance with respect to raster data. In the example illustrated in FIG. 4, the direction is determined so as to proceed from the upper raster line toward the lower raster line, and proceeds from the left side to the right side in order, in each raster line. FIG. 4 illustrates a state in which quantization is completed in pixels (1, 1) to (2, 2), and a pixel (2, 3) is a target pixel for performing quantization.

When describing a simple example of processing using the error diffusion method with reference to FIG. 4, a grayscale value Mm of the target pixel (2, 3) is compared to a predetermined dot forming threshold value Mt, and in a case in which the grayscale value Mm is the same as the dot forming threshold value Mt or more (case of Mm≥Mt) as a result of comparison, data for determining formation necessity of dots is set to data in which "it is necessary to form dots", a correction grayscale value Mh based on a value of a grayscale value Mm (Mm−Mt) which exceeds the dot formation threshold value Mt is distributed to an adjacent pixel in which quantization is not performed, and the correction grayscale value is complemented to a grayscale value of the pixel. In a case in which the grayscale value Mm is lower than the dot formation threshold value Mt (case of Mm<Mt) as a result of comparison, data for determining formation necessity of dots is set to data in which "it is not necessary to form dots", the correction grayscale value Mh based on the grayscale value Mm is distributed to an adjacent pixel in which quantization is not performed, the correction grayscale value is complemented to a grayscale value of the pixel, and processing of setting to a grayscale value of the pixel is performed in order with respect to pixels included in the processing region.

For example, in a case in which the data for determining formation necessity of dots is 1 bit data (two grayscales), the data for determining formation necessity of dots is set to [1] which denotes that it is necessary to form dots in a case of Mm≥Mt, and for example, in a case of setting pixels which are subjected to error diffusion to four pixels ((2, 4), (3, 2), (3, 3), and (3, 4)) which are adjacent to each other, and are not subjected to quantization, the correction grayscale value Mh which is divided by four (=(Mm−Mt)/4), for example, which is based on a value of the grayscale value (Mm−Mt) which exceeds the dot formation threshold value Mt is complemented to grayscale values Mn1 to Mn4 of respective pixels.

In addition, in a case of Mm<Mt, data for determining formation necessity of dots is set to [0] which denotes that it is not necessary to form dots, and for example, the correction grayscale value Mh which is divided by 4 (=Mm/4) based on the grayscale value Mm is complemented to grayscale values Mn1 to Mn4 of the respective pixels.

For example, in a case in which data for determining formation necessity of dots is 2 bit data (four grayscales), first, a generation ratio of dots (respective generation ratio of no dot, small dot, medium dot, and large dot) corresponding to the grayscale value Mm is obtained from the dot generation ratio table in which the grayscale value (0 to 255) and the dot generation ratio correspond to each other, and dots to be formed are selected with a probability of corresponding to the obtained generation ratio of dots. Subsequently, the correction grayscale value Mh is derived based on the grayscale value Mm and a correction value predetermined in each selected dot (no dot, small dot, medium dot, and large dot). For example, in a case in which a small dot with a small generation ratio is selected with respect to a pixel of which a grayscale value is relatively large, a large correction grayscale value Mh in which dots are easily formed in an adjacent pixel is derived, and is equally distributed to the adjacent pixel, for example. In contrast to this, in a case in which a large dot with a small generation ratio is selected with respect to a pixel of which a grayscale value is relatively small, a correction grayscale value Mh in which dots are rarely formed in an adjacent pixel (for example, negative correction value) is derived, and is equally distributed to the adjacent pixel, for example.

A range of diffusing the correction grayscale value Mh is not limited to four pixels which are illustrated in FIG. 4, and for example, may be a range further including eight adjacent pixels ((2, 5), (3, 1), (3, 5), and (4, 1) to (4, 5)) when it is a predetermined range (range of error diffusion will be described later). In addition, a ratio of distribution to be diffused is not necessarily an equal division.

In this manner, in the data conversion using the error diffusion method, it is possible to form a dependency relationship in data processing with respect to data in a diffusion destination, and it is necessary to continuously perform the conversion processing in series, in a range in which the dependency relationship is present, since processing is performed while diffusing a quantization error one after another. As a result, for example, in a case in which an image is large, and is an image with high resolution, the number of pixels to be continuously processed in series increases, and accordingly, a processing time becomes long. Therefore, according to the embodiment, it is possible to further improve throughput of processing by detecting a boundary of a dependency relationship in data processing, and reducing the number of pixels to be continuously processed in series, using an image processing method which will be described below.

The image processing method according to the embodiment is an image processing method in which image data formed of a grayscale value in each pixel which is arranged in a two-dimensional data space is converted into print data including formation necessity of dots which configure a printed image, the method including a non-processing region extracting process of extracting a region in which a total value of the grayscale value of the pixel included in each predetermined division in which a two-dimensional data space is divided does not become a predetermined threshold value as a non-processing region, and a processing region extracting processing of extracting a region of which the periphery is surrounded with the non-processing region as a processing region in the two-dimensional data space, in order to increase throughput of processing in halftoning processing using the error diffusion method in which a dependency relationship in data processing is formed. Specific descriptions thereof will be made below.

Figure 5:
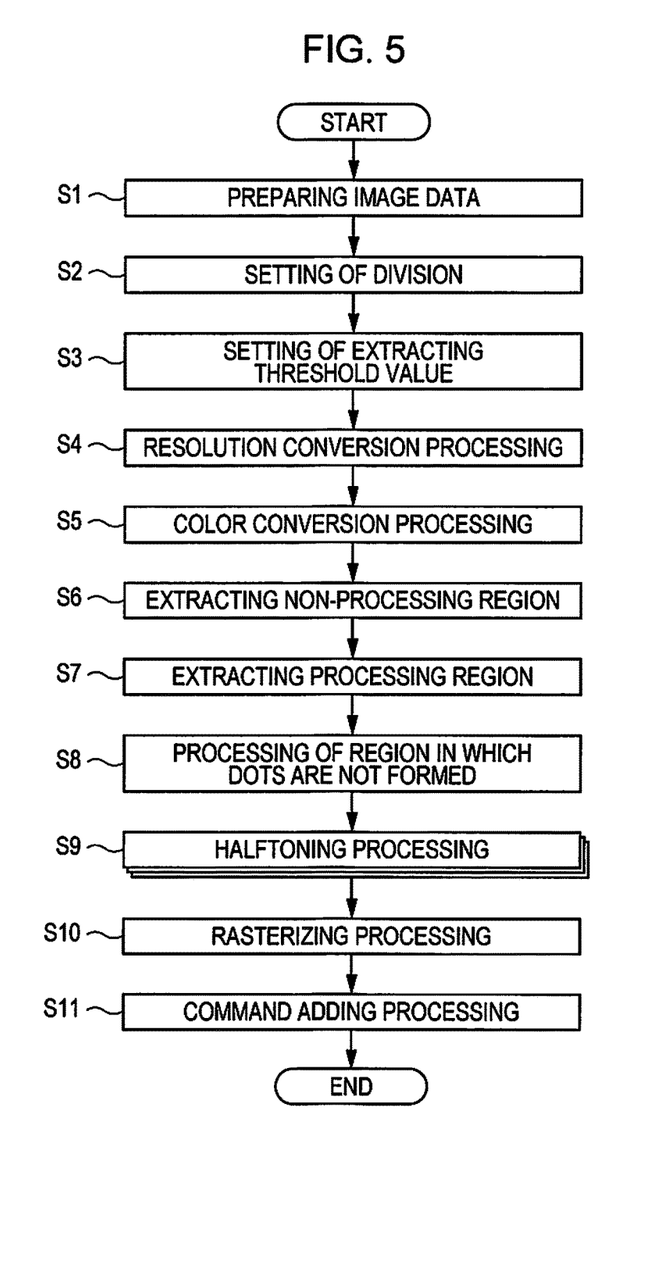
FIG. 5 is a flowchart of an image processing method according to the first embodiment.
Figure 6:
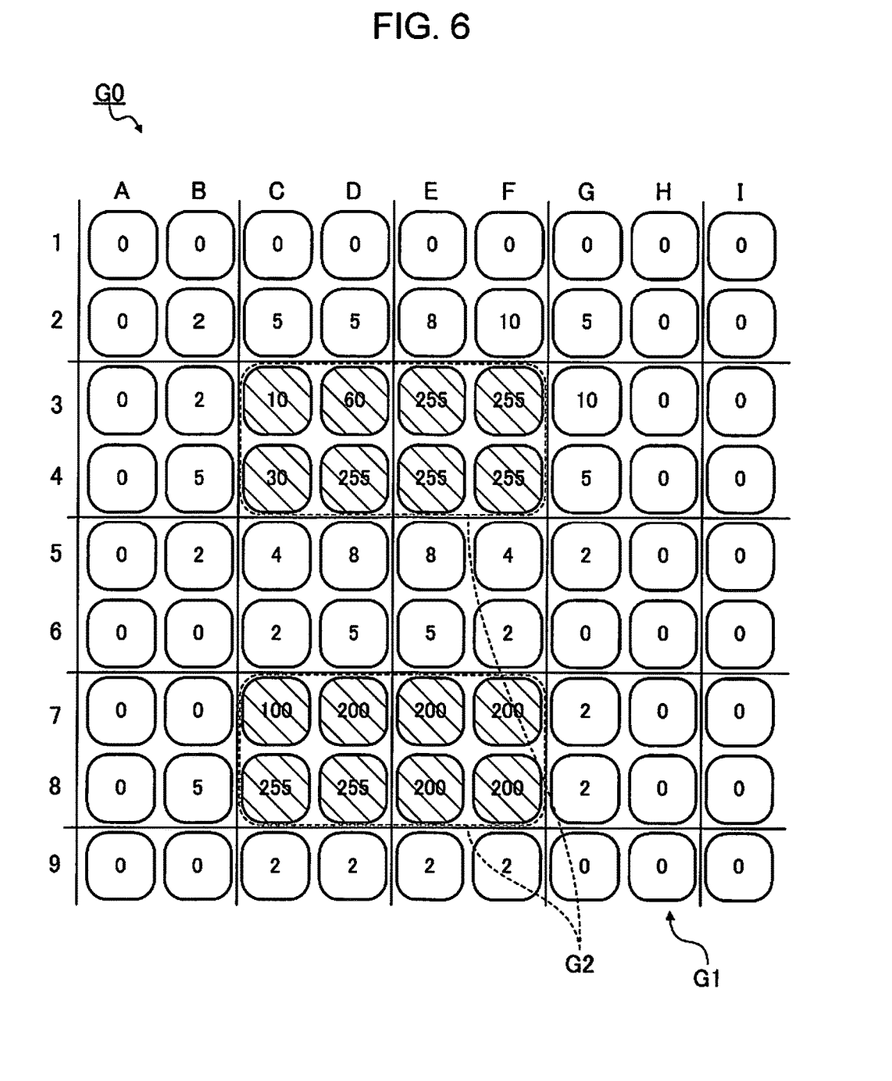
FIG. 6 is a conceptual diagram which illustrates a state of dividing into a processing region and a non-processing region.

FIG. 5 is a flowchart of the image processing method according to the embodiment. FIG. 6 is a conceptual diagram which illustrates a state in which pixels in a two-dimensional data space are divided into predetermined divisions according to the image processing method in the embodiment, and are divided into a processing region and a non-processing region which are formed of the division.

First, as a preparation stage, image data to be printed is input to the PC 110 through the input unit 112 (refer to FIG. 2), and the image data is edited as necessary, using an application of image processing (step S1).

Subsequently, the printer driver is started up from the application, and a dimension of a division for dividing the image data formed of a grayscale value of each pixel which is arranged in a two-dimensional data space is determined as a "predetermined division" (step S2). In addition, a threshold value for extracting a non-processing region and a processing region is set (step S3). It is preferable to set so that it is possible to estimate a quality of a printed image, and a speed of image processing, by performing an evaluation in advance, since a quality of a printed image, and throughput of image processing for generating print data become different depending on a setting method thereof. In addition, it is preferable to set the threshold value while confirming a quality of the printed image, by displaying the printed image on the display unit 113 (function of previewing printing) prior to printing.

Subsequently, the printer driver is shifted to a printing executing mode, and generation processing of print data is started.

The printer driver performs the resolution conversion processing (step S4) and the color conversion processing (step S5) which are described above.

Subsequently, the printer driver performs the "non-processing region extracting processing" in which the non-processing region is extracted, as the "non-processing region extracting process", before shifting to an execution of the half toning processing (step S6). Specifically, first, image data is divided into predetermined divisions which are set. FIG. 6 illustrates pixels of nine rows (first row to ninth row), and of nine columns (A column to I column) in image data G0 in the two-dimensional data space, and illustrates an example in which pixels of 2×2 are set so as to be one division, as a predetermined division. Numbers which are illustrated in FIG. 6, and are denoted in respective pixels mean a grayscale value of respective pixels. Subsequently, a region in which a total value of a grayscale value of a pixel included in a predetermined division does not become a threshold value is extracted as a non-processing region. For example, in a case in which a threshold value is set to 20, a division in which a total of grayscale values of four pixels included in a predetermined division is less than 20 is extracted as a non-processing region G1.

Subsequently, the printer driver performs the "processing region extracting processing" (step S7) in which a region of which the periphery is surrounded with the non-processing region is extracted as a processing region, in the two-dimensional data space as the "processing region extracting process". Specifically, as illustrated in regions in which hatched pixels are surrounded with a broken line in FIG. 6, a region in which divisions in which a total of grayscale values of four pixels included in a predetermined division becomes 20 or more are continued by being adjacent to each other is extracted as a processing region G2. In the example illustrated in FIG. 6, two processing regions G2 are extracted.

Figure 7:
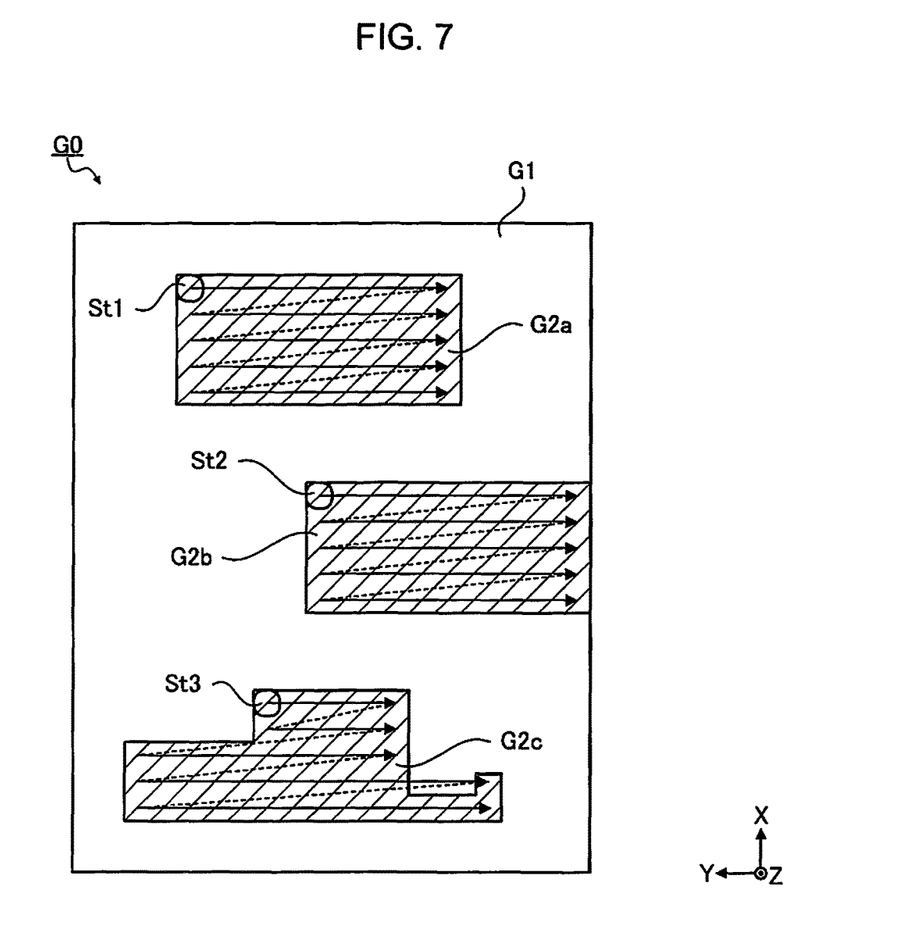
FIG. 7 is a conceptual diagram which illustrates a state in which image data is extracted as three processing regions and a non-processing region.

FIG. 7 is a conceptual diagram which illustrates a state in which the image data G0 is extracted as three processing regions G1a to G2c, and the non-processing region G1.

Like the processing region G2c illustrated in FIG. 7, there is a case in which a processing region G2 is not rectangular; however, it is not necessarily be rectangular. In addition, like a processing region G2b, even in a case in which one side thereof is configured of peripheral pixels (pixels on most peripheral side) of the image data G0, the region is treated as a region of which the periphery is surrounded with the non-processing region G1.

Returning to FIG. 5, subsequently, the printer driver performs processing of a non-forming region of dots with respect to the non-processing region (step S8). Specifically, data for determining formation necessity of dots corresponding to pixels included in the non-processing region is set so as not to form dots. For example, in the example illustrated in FIG. 6, in a case in which data for determining formation necessity of dots corresponding to pixels which are hatched is one bit data (two grayscales), the data for determining formation necessity of dots in print data is set to [0] which denotes that it is not necessary to form dots, and in a case in which data for determining formation necessity of dots is two bit data (four grayscales), the data is set to [00] which denotes that it is not necessary to form dots.

Subsequently, the printer driver performs halftoning processing of pixels in the processing region, using the error diffusion method (step S9). A direction in which error diffusion is performed is set to, for example, four pixels in four directions illustrated in FIG. 4. In addition, the halftoning processing is also performed with respect to pixels included in the division of the non-processing region which is in contact with the processing region in the direction in which the error diffusion is performed. The error diffusion using the halftoning processing is performed up to pixels included in the division of the non-processing region which is in contact with the processing region in the direction in which the error diffusion is performed, and is not performed with respect to pixels which are included in a division beyond the division.

That is, in processing of the region in which dots are not formed (step S8), data for determining formation necessity of dots of print data corresponding to pixels included in the division of the non-processing region which is in contact with the processing region is temporarily set so as not to form dots; however, the data for determining formation necessity of dots is finally determined according to a result obtained by performing error diffusion processing of pixels in the processing region. Accordingly, the data for determining formation necessity of dots corresponding to pixels which are included at least in the non-processing region, and included in the division which is not in contact with the processing region is set so as not to form dots.

In this manner, since the error diffusion using halftoning processing is performed up to pixels included in a division in the non-processing region which is in contact with the processing region in the direction in which the error diffusion is performed, and is not performed with respect to pixels included in a division beyond the division, there is no case in which a dependency relationship in data processing is continued at a boundary portion. As a result, it is possible to simultaneously perform halftoning processing. Specifically, as exemplified in FIG. 7, since dependency relationships in the three processing regions G2a, G2b and G2c are independent, respectively, it is possible to simultaneously perform the halftoning processing in which pixels St1, St2, and St3 as starting points for performing halftoning processing which serve as the starting point. The PC 110 can simultaneously perform halftoning processing using the ASIC 116 and the DSP 117 (refer to FIG. 2) which are provided in the printer control unit 111.

Subsequently, the rasterizing processing (step S10) and the command adding processing (step S11) are performed when the halftoning processing with respect to the entire processing region is completed, and generating processing of print data is completed.

As described above, the printer driver is an image processing program which is executed in the image processing apparatus (PC 110) in which image data formed of a grayscale value of each pixel which is arranged in a two-dimensional data space is converted into print data including formation necessity of dots which configures a printed image, the program including a non-processing region extracting step in which a region in which a total value of the grayscale value of the pixel included in each predetermined division in which a two-dimensional data space is divided does not become a predetermined threshold value is extracted as a non-processing region, and a processing region extracting step in which a region of which the periphery is surrounded with the non-processing region is extracted as a processing region in the two-dimensional data space.

As described above, it is possible to obtain the following effects according to the image processing method, the image processing apparatus, the image processing program, and the printing system according to the embodiment.

It is possible to divide a region of image data using an index of a grayscale value (that is, density of dots) of a pixel by extracting a region in which a total value of a grayscale value of a pixel included in each predetermined division does not become a predetermined threshold value as a non-processing region, and extracting a region of which the periphery is surrounded with the non-processing region as a processing region. By dividing a region of image data in this manner, it is possible to select a data conversion method which is appropriate for respective regions.

In the processing of converting image data into print data, it is possible to perform batch processing in which data for determining formation necessity of dots corresponding to a pixel included in the non-processing region, and is included in a division which is not in contact with the processing region is set so as not to form dots. That is, since it is not necessary to perform conversion processing of data related to each pixel in the same way, in the entire image data, it is possible to improve throughput in data conversion processing.

In addition, a pixel included in a division which is in contact with a processing region becomes a data conversion target, and since error diffusion from the pixel included in the processing region is reflected in a case of performing halftoning processing using the error diffusion method, for example, it is possible to suppress a deterioration in image quality at a boundary between the processing region and the non-processing region.

It is possible to improve throughput in data conversion processing by simultaneously performing halftoning processing with respect to respective processing regions, in a case in which there are a plurality of extracted processing regions. For example, it is possible to improve throughput in data conversion processing, by using the plurality of DSPs 117 simultaneously, as a data conversion processing engine.

In the halftoning processing, the error diffusion processing based on the error diffusion method is performed, and the error diffusion processing is performed from the pixels which are included in the processing region, and are in contact with the non-processing region to the pixels which are included in the non-processing region, and are included in the division which is in contact with the processing region. For this reason, it is possible to perform the data conversion without deteriorating printing quality, since error diffusion of pixels included in the processing region is appropriately performed by appropriately setting a predetermined division.

In addition, since the error diffusion processing is not performed in pixels which are included in the non-processing region, and are included in a division which is not in contact with the processing region, it is possible to make a time necessary for error diffusion processing short, and improve throughput in data conversion processing.

According to the printing system 1, it is possible to perform printing with high efficiency.

This application claims priority under 35 U.S.C. 119 to Japanese Patent Application No. 2016-031687, filed Feb. 23, 2016. The entire disclosure of Japanese Patent Application No. 2016-031687 is hereby incorporated herein by reference.

What is claimed is:

1. An image processing method in which image data including a grayscale value in each pixel is converted into print data including formation necessity of dots, the method comprising:
   dividing image data, to which color conversion processing has been performed, into predetermined divisions in a two-dimensional data space, each predetermined division including a plurality of pixels;
   extracting a region in which a total value of grayscale values of the plurality of pixels included in each predetermined division does not become a predetermined threshold value as a non-processing region; and
   extracting a region surrounded with the non-processing region in the two-dimensional data space as a processing region.

2. The image processing method according to claim 1, wherein data for determining formation necessity of dots which is included in the non-processing region, and corresponds to a pixel included in the division which is not in contact with the processing region is set so as not to form dots.

3. The image processing method according to claim 1, wherein halftoning processing is simultaneously performed with respect to the respective processing regions, in a case in which there are a plurality of the processing regions which are extracted.

4. The image processing method according to claim 3, wherein, in the halftoning processing, error diffusion processing based on an error diffusion method is performed,
   the error diffusion processing is performed from a pixel which is included in the processing region, and is in contact with the non-processing region to a pixel which is included in the non-processing region, is included in the division which is in contact with the processing region, and
   the error diffusion processing is not performed with respect to a pixel included in the non-processing region, and is included in the division which is not in contact with the processing region.

5. An image processing apparatus which converts image data including a grayscale value in each pixel into print data including formation necessity of dots, the apparatus comprising:
   an input unit which inputs the image data; and
   an operation unit which converts the input image data into the print data,
   the operation unit performing
   dividing image data, to which color conversion processing has been performed, into predetermined divisions in a two-dimensional data space, each predetermined division including a plurality of pixels,
   non-processing region extracting processing of extracting a region in which a total value of grayscale values of the plurality of pixels included in each predetermined division does not become a predetermined threshold value as a non-processing region, and
   processing region extracting processing of extracting a region surrounded with the non-processing region in the two-dimensional data space as a processing region.

6. The image processing apparatus according to claim 5, wherein the operation unit sets data for determining formation necessity of dots corresponding to a pixel which is included in the non-processing region, and is included in the division which is not in contact with the processing region so as not to form dots.

7. The image processing apparatus according to claim 5, wherein the operation unit simultaneously performs halftoning processing with respect to the respective processing regions, in a case in which there are a plurality of the processing regions which are extracted.

8. A printing system comprising:
   a printing apparatus which performs printing based on the image processing apparatus according to claim 5 and print data which is generated by the image processing apparatus.

9. A printing system comprising:
   a printing apparatus which performs printing based on the image processing apparatus according to claim 6 and print data which is generated by the image processing apparatus.

10. A printing system comprising:
    a printing apparatus which performs printing based on the image processing apparatus according to claim 7 and print data which is generated by the image processing apparatus.

11. A non-transitory computer-readable medium with an image processing program which is executed in an image processing apparatus which converts image data including a grayscale value in each pixel to print data including formation necessity of dots, the program comprising:
    dividing image data, to which color conversion processing has been performed, into predetermined divisions in a two-dimensional data space, each predetermined division including a plurality of pixels
    extracting a region in which a total value of grayscale values of the plurality of pixels included in each predetermined division does not become a predetermined threshold value as a non-processing region; and
    extracting a region surrounded with the non-processing region in the two-dimensional data space as a processing region.

* * * * *